United States Patent

Petrella et al.

[11] Patent Number: 5,844,012
[45] Date of Patent: Dec. 1, 1998

[54] PROCESS AND COMPOSITION FOR IMPROVING THE CURE OF WATER-BLOWN MOLDED POLYURETHANE FOAM

[75] Inventors: Robert Gabriel Petrella, Allentown; John Joseph Koch, Coplay; Thomas William Bodnar, Macungie, all of Pa.

[73] Assignee: Air Products and Chemicals, Inc., Allentown, Pa.

[21] Appl. No.: 904,929

[22] Filed: Aug. 1, 1997

Related U.S. Application Data

[63] Continuation of Ser. No. 607,955, Feb. 29, 1996, abandoned.
[51] Int. Cl.$^6$ .......................................................... C08J 9/04
[52] U.S. Cl. .......................... 521/128; 521/115; 521/123; 521/124; 521/125; 521/129; 521/130; 521/137; 521/155; 521/163; 521/170; 521/902
[58] Field of Search ..................................... 521/115, 123, 521/124, 125, 128, 129, 130, 137, 155, 163, 170, 902

[56] References Cited

U.S. PATENT DOCUMENTS

| | | |
|---|---|---|
| 3,804,782 | 4/1974 | Demon et al. . |
| 3,896,052 | 7/1975 | Lockwood et al. . |
| 3,903,018 | 9/1975 | Kolakowski et al. . |
| 4,101,465 | 7/1978 | Lockwood et al. ...................... 521/118 |
| 4,176,218 | 11/1979 | Demou et al. .......................... 521/129 |
| 4,686,240 | 8/1987 | Bailey, Jr. et al. ...................... 521/103 |
| 5,086,175 | 2/1992 | Minato et al. .......................... 544/221 |
| 5,252,624 | 10/1993 | Millren .................................... 321/117 |
| 5,539,011 | 7/1996 | Hilker et al. ............................ 521/163 |

*Primary Examiner*—John M. Coaney, Jr.
*Attorney, Agent, or Firm*—Michael Leach

[57] ABSTRACT

A method for producing water-blown molded flexible polyurethane foam which comprises reacting and foaming in one step in a mold a reaction mixture comprising a polyol, an organic polyisocyanate, a urethane catalyst composition and water and a trimerization catalyst which is a quaternary ammonium salt or an alkali metal or alkaline earth metal salt of a Brönsted acid having a pKa of >1, characterized in that the trimerization catalyst is present in an amount from about 0.005 to 0.04 gram milliequivalents per 100 grams of polyol. The preferred trimerization catalyst is an alkali metal N-(2-hydroxyphenyl)methyl glycinate, especially an alkali metal N-(2-hydroxy-5-nonylphenyl)methyl-N-methyl glycinate.

16 Claims, No Drawings

PROCESS AND COMPOSITION FOR IMPROVING THE CURE OF WATER-BLOWN MOLDED POLYURETHANE FOAM

This is a continuation of application Ser. No. 08/607,955 filed 29 Feb. 1996 which is now abandoned.

TECHNICAL FIELD OF THE INVENTION

The present invention relates to a process for preparing stable water-blown flexible polyurethane foam.

BACKGROUND OF THE INVENTION

Flexible polyurethane foams have many commercial uses. The principal commercial procedure for the production of flexible polyurethane foams is the "one-shot" technique of reacting and foaming all of the starting materials in one step. The starting materials usually include a polyol, a polyisocyanate, water, catalysts, a silicone surfactant and a crosslinker.

Commercially, water-blown flexible polyurethane foams are produced by both molded and slab foam processes. Molding is utilized to produce directly an object in essentially its final dimensions. Automotive seating and some furniture cushions are examples of the molding process. An important consideration in molding of flexible polyurethane foams is the demold time. The demold time, which is the time from the mixing of the polyisocyanate with the other starting materials to the removal of the molded foam from the mold, is usually from 2 to 6 minutes in commercial practice. It is highly desirable to utilize a formulation which will permit rapid demolding of the cured foam which has good green strength, i.e., strength as initially produced, and so is resistant to tearing or "fingerprinting", regardless of the foam density.

One of the objects of the industry is to provide improved curing rates of molded flexible polyurethane foam to achieve rapid demolding without adversely affecting processability, foam openness and the physical properties of the resulting foam.

The industry has obtained improved cure rates in a number of ways. They include higher catalyst levels which, unfortunately, concomitantly reduces the flowability (poorer processability) and yields a tighter foam; higher mold temperatures which reduce processability by inhibiting flow; reducing the time spread during cure that pressure release is effective producing tighter foam; or the use of additional surface cure catalyst which increases cost and tightens the foam. Other techniques are taught in the following patents:

U.S. Pat. No. 4,686,240 discloses a process for producing water-blown, flexible polyurethane foams for improved foam stability and molded water-blown, flexible polyurethane foams that are rapidly demoldable with improved green strength. The process involves the use of certain compounds identified as "trimerization catalysts" consisting of an alkali metal or alkaline earth metal ion and an ion of a Brönsted acid having a pKa of >1, other than: (a) an inorganic alkaline earth metal salt that has a water solubility of <1 gram of salt per 100 milliliters of water at 25° C., (b) alkali metal dihydrogen phosphate and (c) alkali metal sulfate].

U.S. Pat. No. 4,176,218 discloses a flexible, highly resilient, cold-cure, closed-mold polyurethane foam produced by a reacting a foamable mixture comprising an organic polyisocyanate, water and a polyol. The foams are preferably prepared from a mixture of a hydroxyl-terminated graft copolymer and a hydroxyl-terminated polyalkyleneoxy polyether in the presence of a co-catalyst mixture of at least one tertiary amine catalyst and at least one metal containing basic catalyst selected from the group consisting of an alkali metal hydroxide, an alkaline earth metal hydroxide, an inorganic basic salt thereof derived from the reaction of the hydroxides with a weak inorganic acid, a metal organic basic salt catalyst derived from the reaction of at least one of the hydroxides with an organic acid and mixtures thereof.

U.S. Pat. No. 3,896,052 discloses a catalyst combination for the trimerization of polyisocyanates to polyisocyanurates comprising (i) an alkali metal salt of an N-substituted amide, (ii) an alkali metal salt of an N-(2-hydroxyphenyl)methyl glycine and optionally a tertiary amine trimerization catalyst.

U.S. Pat. No. 3,903,018 discloses a catalyst combination for making polyisocyanurates comprising (i) a tertiary amine trimerization catalyst containing a dimethylamino moiety, (ii) an alkali metal salt of an N-(2-hydroxyphenyl)methyl glycine, and (iii) a monomeric epoxide.

U.S. Pat. No. 4,101,465 discloses a catalyst combination for the preparation of polyisocyanurate foams comprising (a) alkali metal glycine salts, (b) hydroxyalkyl trialkyl-ammonium carboxylate salts, and (c) alkali metal salts selected from the group consisting of (i) alkali metal salts of N-phenyl aliphatic amides, and (ii) alkali metal salts of aliphatic carboxylic acids.

SUMMARY OF THE INVENTION

The present invention provides an improvement in the method for producing water-blown molded flexible polyurethane foam which method comprises reacting and foaming in one step in a mold a reaction mixture comprising a polyol, an organic polyisocyanate, a urethane catalyst composition and water. The improvement comprises a isocyanate trimerization catalyst present in the reaction mixture in an amount from about 0.005 to 0.04 gram milliequivalents per 100 grams of polyol.

As an advantage of the invention the method provides for a rapid cure with an excellent surface cure while not adversely affecting the processability, demoldability or openness of the resulting molded polyurethane foam. A longer cream time is provided to increase the surface wetting of the mold by the wet chemicals before the foaming starts.

DETAILED DESCRIPTION OF THE INVENTION

The invention relates to a process for producing water-blown molded flexible polyurethane foams by reacting and foaming in one step in a mold a reaction mixture comprising a polyol, an organic polyisocyanate, a urethane catalyst composition, water and a compound which is an isocyanate trimerization catalyst. Suitable trimerization catalysts include quaternary ammonium salts and an alkali metal or alkaline earth metal salt of a Brönsted acid having a pKa >1, wherein the compound is other than (a) an inorganic alkaline earth metal salt that has a water solubility of <1 gram of salt per 100 milliliters of water at 25° C., (b) alkali metal dihydrogen phosphate, (c) alkali metal sulfate and (d) alkali metal and alkaline earth metal hydroxides and alkoxides.

Examples of suitable organic polyisocyanates are hexamethylene diisocyanate, isophorone diisocyanate, phenylene diisocyanate, toluene diisocyanate and 2,4'- or 4,4'-methane diphenyl diisocyanate. Especially suitable are the 2,4-and 2,6-toluene diisocyanates, individually or together as their commercially available mixtures. Other suitable mixtures of diisocyanates are those known commercially as "crude MDI", also known as PAPI, which contain about 60% of 4,4'-diphenyl methane diisocyanate along with other isomeric and analogous higher polyisocyanates. Also suitable are "prepolymers" of these polyisocyanates comprising a partially prereacted mixture of polyisocyanates and diols, polyether polyols or polyester polyols.

The amount of polyisocyanate in the foam composition is such as to provide an isocyanate (NCO) index of 90–120, preferably 95–115.

Illustrative of suitable polyols as a component of the polyurethane composition are the polyalkylene ether and polyester polyols. The polyalkylene ether polyols include the poly(alkylene oxide) polymers such as poly(ethylene oxide) and a poly(propylene oxide) polymers and their copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylolpropane and like low molecular weight polyols.

In the practice of this invention, a single high molecular weight polyether polyol may be used. Also, mixtures of high molecular weight polyether polyols such as mixtures of di-and tri functional materials and/or different molecular weight or different chemical composition materials may be used.

Useful polyester polyols include those produced by reacting a dicarboxylic acid with an excess of a diol, for example adipic acid with ethylene glycol or butane diol, or reacting a lactone with an excess of a diol such a caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second of type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The blowing agent of the present invention is water. Suitable use levels of water in the all water foam formulations may be 2 to 5 parts by weight (pbw) water per 100 parts (php) polyol, preferably 2.5 to 4.5 php. Although an all water blowing agent is highly preferred, other blowing agents known in the art, such as carbon dioxide, pentane, methylene chloride, CFCs and HCFCs, can be used with the water.

The urethane catalyst composition used to make the water blown molded polyurethane foam typically comprises a gelling catalyst for catalyzing the reaction between the polyisocyanate and polyol and a blowing catalyst for catalyzing the reaction between the polyisocyanate and water to generate carbon dioxide. Suitable gelling catalysts and blowing catalysts include any of those materials known in the art for making water-blown molded flexible polyurethane foams. Suitable gelling catalysts that can be used as is or acid blocked would include bis(dimethylaminopropyl) methylamine, triethylamine, dimethylaminoethylmorpholine, 1,4-dimethylpiperazine and preferably triethylenediamine (TEDA). Suitable blowing catalysts that can be used as is or acid blocked include bis(dimethylaminoethyl) ether (BDAEE), pentamethyldiethylenetriamine, bis (dimethylaminopropyl)methylamine; tris(dimethylaminopropyl)amine; N,N-dimethylaminoethyl-N'-methylethanolamine; N,N-dimethylaminoethoxyethanol; N,N-diethylaminoethoxyethanol; N,N-dimethylaminopropylamine; N-methylethanolamine; N,N-dimethylaminopropyl-N'-methylethanolamine; N,N-dimethylaminocyclohexylamine and N-methyldicyclohexylamine.

A catalytically effective amount of the catalyst composition is used in the polyurethane formulation. More specifically, suitable amounts of the catalyst composition may range from about 0.01 to 3 parts by weight per 100 parts polyol in the polyurethane formulation.

Other typical agents found in the polyurethane foam formulations include chain extenders such as ethylene glycol and butane diol, crosslinkers such as diethanolamine, diisopropanolamine, triethanolamine and tripropanolamine; and cell stabilizers such as silicone surfactants.

Manufacturers of polyurethane foam typically use masterbatches, or premix compositions, consisting of one or more polyols plus water, amine catalysts and, optionally cell stabilizers, organometallic salts, blowing agents, crosslinkers, dyes or pigments and flame retardants. These are known as the "B" side components. The "A" side comprises the polyisocyanate materials.

The masterbatch whose temperature is typically 65° to 110° F. (18° to 43° C.), but usually 70° to 90° F. (21° to 32° C.), and the isocyanate typically held at 70° to 80° F. (21° to 27° C.), but may run as high as 100° F. (38° C.), are mixed in commercial high or low pressure machines before being injected into the mold or poured onto the slab line bed. The mold temperature can range from ambient to 170° F. (82° C.), typically 110° to 155° F. (43° to 68° C.). The mold is closed to prevent foam from escaping. Depending upon the application/mold temperature, the cured foam will be removed from the mold in as short as one minute to 30 minutes. A typical foam residence time is 2 to 6 minutes with most being about 3 to 4 minutes. The demolded foam is sufficiently cured at demold to be handled without accepting any deformation.

Suitable isocyanate trimerization catalysts for use in practicing the invention include quaternary ammonium salts and alkali metal or alkaline earth metal salts of a Brönsted acid having a pKa >1, wherein the compound is other than (a) an inorganic alkaline earth metal salt that has a water solubility of <1 gram of salt per 100 milliliters of water at 25° C., (b) alkali metal dihydrogen phosphate, (c) alkali metal sulfate and (d) alkali metal and alkaline earth metal hydroxides and alkoxides.

The trimerization catalysts as employed in the process of this invention include a wide variety of compounds including: (A) quaternary ammonium salts, (B) alkali metal and alkaline earth metal salts of inorganic acids including those derived from such acids as carbonic, boric and phosphorous acids (other than an inorganic alkaline earth metal salt that has a water solubility of <1 gram of salt per 100 milliliters of water at 25° C. and other alkali metal dihydrogen phosphates and sulfates), and (C) alkali metal and alkaline earth metal salts of carboxylic acids.

The quaternary ammonium salts that can be used are those materials typically used in the art for making isocyanurate foam and preferably comprise salts of quaternary ammonium cations, especially hydroxyalkyl group-containing quaternary ammonium cations, and carboxylate anions, e.g., trimethyl-2-hydroxypropylammonium formate; N-(2-hydroxypropyl)triethylenediamine 2-ethylhexanoate and dimethyl-2-hydroxyethyl-2-hydroxypropylammonium formate. Representative quaternary ammonium compounds are those compounds taught in U.S. Pat. Nos. 3,168,483; 3,294,753; 3,892,687; 3,988,267; 3,993,652; 4,040,992; 4,116,879 and 4,582,861, the disclosures of which are incorporated by reference.

Illustrative of other suitable trimerization catalysts are trisodium and tripotassium phosphate, disodium and dipotassium hydrogen phosphate, sodium and potassium tetraborate and sodium and potassium carbonate; sodium and potassium acetate, sodium and potassium hexanoate, sodium and potassium chloroacetate, sodium and potassium dichloroacetate, lithium acetate, calcium acetate, potassium and sodium oleate, potassium and sodium salts of p-aminobenzoic acid, sodium and potassium salts of half-acids of succinic anhydride and an alkoxypolyethyleneoxyethanol, and potassium and sodium salts of half-acids derived from succinic anhydride and diethanolamine (by amidation) or dimethylaminoethoxyethanol (by esterification).

The preferred trimerization catalysts are the alkali metal salts of carboxylic acids, especially N-(2-hydroxyphenyl) methyl glycine as disclosed in U.S. Pat. No. 3,896,052, which is incorporated by reference. Of these alkali metal glycinates, the preferred material is sodium N-(2-hydroxy-5-nonylphenyl)methyl-N-methyl glycinate which is commercially available as Curithane® 52 catalyst (a 50% active mixture in diethylene glycol) from Air Products and Chemicals, Inc.

The amount of the trimerization catalyst used in the process of the invention will range from about 0.005 to 0.04 gram milliequivalents of trimerization catalyst per 100 grams of polyol. Preferably, from about 0.006 to 0.03 gram milliequivalents of trimerization catalyst per 100 grams of polyol are used, most preferably, 0.008 to 0.03 gram milliequivalents.

The trimerization catalyst used in the process of this invention is usually employed dissolved, or stably dispersed, in a liquid medium. The liquid medium utilized is water, a polyol (including the polyols and polymer polyols described above) or the B-side composition.

A preferred embodiment for providing the trimerization catalyst to the foam formulation is as a component in a catalyst composition comprising (i) 92.5 to 99.9 wt % of a tertiary amine urethane catalyst blend which comprises 40 to 60 wt % gelling catalyst and 40 to 60 wt % blowing catalyst and (ii) 0.1 to 7.5 wt % isocyanate trimerization catalyst. Preferably, the catalyst composition comprises 94 to 99.85 wt % tertiary amine urethane catalyst and 0.15 to 6 wt % trimerization catalyst. Suitable tertiary amine gelling and blowing catalysts are those known in the art as previously stated.

A general all water-blown molded polyurethane flexible foam formulation according to the invention would comprise the following components in parts by weight (pbw):

| FLEXIBLE FOAM FORMULATION | |
|---|---|
| | Parts By Weight |
| Polyol | 20–100 |
| Polymer Polyol | 80–0 |
| Silicone Surfactant | 1–2.5 |
| Water | 2–5 |
| Crosslinker | 0.5–2 |
| Catalyst (Gelling and Blowing) | 0.15–2 |
| Trimerization Catalyst ($\times 10^{-3}$) | 2–12 |
| Isocyanate Index | 90–120 |

In the following examples the following terms have the described meaning:

Demold time is the time from the start of mixing the catalyzed masterbatch and isocyanate until the cured foam is removed from the mold.

Cream Time is the time from the start of mixing the masterbatch with the isocyanate until either a change in color caused by bubble formation or the mixture starts to rise in the mixing cup.

Extrusion time is the time from the start of mixing of the masterbatch and the isocyanate until the foam starts to extrude rapidly from all vents on the mold. There are 5 vents in the mold, the four part line corner vents and the vent in the middle of the mold lid. Extrusion time is measured at the lid vent which doesn't start to extrude rapidly until the corner vents are all extruding foam.

String Gel time is the time from the start of mixing the masterbatch with the isocyanate to the time when the foam is touched by a wooden tongue depressor and a string can be pulled for at least two inches in one continuous motion.

Mold Description. The mold is a 12"×12"×4" (30.5×30.5×10.2 cm) aluminum mold with a hinged lid. The mold is heated by electric heating pads on the bottom and top surfaces. The energy input is controlled by a power transformer to maintain a constant temperature. The mold temperature is allowed to vary ±2° F. (±1° C.) from the target temperature. The mold has 4 corner vents at the part line approximately 1/16 inch (1.6 mm) deep. In addition, it has a centered screw in vent with a diameter of 1/16 inch (1.6 mm). All mold surfaces are covered with an insulating foam. The mold was prepped with water paste wax before use and was sprayed with a water based release agent before each foam pour.

The rating system for the pinch test and the corner appearance are as follows:

| Rating | Definition |
|---|---|
| | PINCH TEST |
| 10 | No visible Indentation |
| 9 | Minimal Indentation |
| 8 | Very Slight Indentation |
| 7 | Slight Indentation |
| 6 | Moderate Indentation |
| 5 | Severe Indentation |
| 4 | Some Deformation |
| 3 | Moderate Deformation |
| 2 | Severe Deformation |
| 1 | Minimal Recovery |
| 0 | No Recovery |
| | CORNER APPEARANCE |
| 10 | Perfect Corners |
| 9 | Skin Loss One Corner |

-continued

| Rating | Definition |
|---|---|
| 8 | Skin Loss Two Corners |
| 7 | Skin Loss Three Corners |
| 6 | Skin Loss Four Corners |
| 5 | Skin Loss One or Two Corners + one Tear |
| 4 | Skin Loss One or Two Corners + Two Tears |

-continued

| Rating | Definition |
|---|---|
| 3 | Skin Loss Two or more Corners + Three Tears |
| 2 | Skin Loss Three + Corners + Four Tears |
| 1 | Skin Loss & Tears Four Corners |

EXAMPLE 1

In Example 1 the following water blown molded flexible polyurethane foam formulation was used:

| Component | parts by weight |
|---|---|
| Conventional Polyol, Triol EO Capped | 50 |
| SAN Graft Polyol, Triol EO Capped | 50 |
| DABCO ® DC5403 Silicone Surfactant | 1.6 |
| Diethanolamine | 1.28 |
| Water, Total | 3.6 |
| DABCO 33-LV ® (TEDA) | 0.2 |
| DABCO ® BL-11 (BDAEE) | 0.08 |
| Amine Blend* | 0.6 |
| TDI Index = 100 | |

*Amine Blend
7.5% Bis(dimethylaminopropyl)methylamine
5.5% Tris(dimethyiaminopropyl)amine
5.0% Water
81.0% Nonylphenoxyethoxyethanol (EQ = ~9.5)
1.0% Curithane 52 (50% active) trimer catalyst This Example shows the preparation of Foams B–E in which the sodium N-(2-hydroxy-5-nonylphenyl)methyl-N-methyl glycinate (Curithane 52 catalyst) content of the amine blend was varied from 0.0015 to 0.015 parts per hundred polyol (php), or equivalently, 0.0044 to 0.0437 g meq/100 g polyol. Foam A was the control which contained no trimerization catalyst. In Foams F–M the glycinate salt was replaced with the specified amount of various salts, all at 0.0087 g meq/100 g polyol. Table 1 shows the relevant reaction parameters and properties of the molded foam. It can be seen from the data that the very low levels of 0.0087 to 0.0262 g meq glycinate salt per 100 g polyol provided a surprising improvement in the pinch test and corner ratings for the foam. At the 0.0044 and 0.0437 g meq levels, the pinch test and corner ratings were marginally acceptable. In addition, all the salts used at 0.0087 g meq in making Foams F–J gave acceptable performance.

TABLE 1

| FOAM | A | B | C | D | E | F | G | H | I | J |
|---|---|---|---|---|---|---|---|---|---|---|
| Salt in Amine Blend | — | C-52 | C-52 | C-52 | C-52 | f | g | h | i | j |
| php (×10$^{-3}$) | — | 1.5 | 3 | 9 | 15 | 1.4 | 1.4 | 1.6 | 0.7 | 0.9 |
| meq/100 g polyol (×10$^{-3}$) | — | 4.4 | 8.7 | 26.2 | 43.7 | 8.7 | 8.7 | 8.7 | 8.7 | 8.7 |
| Mold temp (F.) | 160 | 160 | 160 | 160 | 160 | 160 | 160 | 160 | 160 | 160 |
| Demold Time (min.) | 4.25 | 4.25 | 4.25 | 4.25 | 4.25 | 4.25 | 4.25 | 4.25 | 4.25 | 4.25 |
| Cream Time (sec.) | 7.1 | 7.2 | 8 | 8 | 8.1 | 7.3 | 8.4 | 7.7 | 7.6 | 7.6 |
| Extrusion time (sec.) | 34.3 | 42.4 | 46.9 | 43.8 | 53.1 | 40.4 | 53.2 | 32 | 34.3 | 35.1 |
| String Gel (sec.) | 58.1 | 62 | 65.8 | 63.1 | 68.8 | 52 | 67.1 | 55.2 | 56.2 | 55.4 |
| Pinch Test | 2 | 6 | 8 | 9 | 7 | 9 | 8 | 10 | 8 | 8 |
| Corner Rating | 3 | 5 | 6 | 9 | 6 | 8 | 9 | n/t | n/t | n/t |

C-52 sodium N-(2-hydroxy-5-nonylphenyl)methyl-N-methyl glycinate
f potassium acetate
g calcium acetate
h potassium octoate
i sodium acetate
j sodium carbonate

EXAMPLE 2

In this Example the following water blown molded flexible polyurethane foam formulation was used:

| Component | parts by weight |
|---|---|
| Conventional Polyol, Triol EO Capped | 150 |
| SAN Graft Polyol, Triol EO Capped | 150 |
| DABCO ® DC5403 Silicone Surfactant | 4.8 |
| Diethanolamine | 4.5 |
| Water, Total | 10.14 |
| DABCO 33-LV ® | 0.6 |
| DABCO ® BL-11 | 0.24 |
| Amine Blend* | 1.8 |
| TDI Index = 100 | |

*Amine Blend
7.5% Bis(dimethylaminopropyl)methylamine
5.5% Tris(dimethylaminopropyl)amine
5.0% Water
81.0% Nonylphenoxyethoxyethanol(EO = ~9.5)
1.0% Curithane 52(50% active)

This Example shows the preparation of Foams K–O in which the sodium N-(2-hydroxy-5-nonylphenyl)methyl-N-methyl glycinate (Curithane 52 catalyst) in the amine blend of Foam K was replaced with various quaternary ammonium carboxylate salts and potassium hydroxide. Each variation of the Foam K run was made in the following manner. A solution was made of bis(dimethylaminopropyl) methylamine 41.67%, tris(dimethylaminopropyl)amine 30.56% and water 27.78%. To 18 g of this solution was added the necessary amount of each additive to provide 0.00134 moles plus enough nonylphenoxyethoxyethanol to yield 100 g. An appropriate amount of the resulting solution was used in the foam formulation to provide 0.0087 g meq/100 g polyol. (When the KOH was added to the water/amine blend, an oily layer was observed which slowly dissolved on standing before the nonylphenoxyethoxyethanol was added.)

TABLE 2

| FOAM | K | L | M | N | O |
|---|---|---|---|---|---|
| Trimer Catalyst in Amine Blend | C-52 | o | p | q | r |
| php (×10$^{-3}$) | 3 | 1.7 | 1.4 | 0.5 | 2.7 |
| meq/100 g polyol (×10$^{-3}$) | 8.7 | 8.7 | 8.7 | 8.7 | 8.7 |
| Mold temp (F.) | 160 | 160 | 160 | 160 | 160 |
| Demold Time (min.) | 3.5 | 3.5 | 3.5 | 3.5 | 3.5 |
| Cream Time (sec.) | 6.54 | 6.82 | 7.06 | 6.78 | 6.95 |
| Extrusion time (sec.) | 34.48 | 33.99 | 35.08 | — | 35.05 |
| String Gel (sec.) | 56.93 | 55.52 | 55.68 | 60.32 | 56.95 |
| Pinch Test | 8 | 8 | 9 | 4 | 8 |
| Corner Rating | 10 | 10 | 10 | 9 | 10 |

C-52) sodium N-(2-hydroxy-5-nonylphenyl)methyl-N-methyl glycinate
L) Dimethyl-2-hydroxyethyl-2-hydroxypropylammonium formate
M) Trimethyl-2-hydroxypropylammonium formate
N) KOH
O) N-(2-hydroxypropyl)triethylenediamine 2-ethylhexanoate The data in Table 2 shows that only potassium hydroxide did not afford a foam that passed the pinch test.

STATEMENT OF INDUSTRIAL APPLICATION

The invention provides a method and composition for improving the cure rate of molded flexible polyurethane foams.

We claim:

1. In a method for producing water-blown molded flexible polyurethane foam which comprises reacting and foaming in one step in a mold a reaction mixture comprising a polyol, an organic polyisocyanate, a urethane catalyst composition comprising a gelling catalyst and a blowing catalyst, and water as a blowing agent, the improvement for enhancing the surface cure of the molded foam which comprises adding to the reaction mixture an isocyanate trimerization catalyst in an amount from about 0.005 to 0.04 gram milliequivalents per 100 grams of polyol, the trimerization catalyst being a quaternary ammonium salt or an alkali metal or alkaline earth metal salt of a Brönsted acid having a pKa of >1, wherein the compound is other than (a) an inorganic alkaline earth metal salt that has a water solubility of <1 gram of salt per 100 milliliters of water at 25° C., (b) alkali metal dihydrogen phosphate, (c) alkali metal sulfate and (d) an alkali metal or alkaline earth metal hydroxide or alkoxide.

2. In a method for producing water-blown molded flexible polyurethane foam which comprises reacting and foaming in one step in a mold a reaction mixture comprising a polyol, an organic polyisocyanate, a urethane catalyst composition comprising a gelling catalyst and a blowing catalyst, and water as a blowing agent, the improvement for enhancing the surface cure of the molded foam which comprises adding to the reaction mixture a trimerization catalyst which is a quaternary ammonium carboxylate or an alkali metal carboxylate in an amount from about 0.006 to 0.03 gram milliequivalents per 100 grams of polyol.

3. The method of claim 1 in which the trimerization catalyst is an alkali metal carboxylate.

4. The method of claim 3 in which the trimerization catalyst is an alkali metal N-(2-hydroxyphenyl)methyl glycinate.

5. The method of claim 3 in which the trimerization catalyst is an alkali metal N-(2-hydroxy-5-nonylphenyl)methyl-N-methyl glycinate.

6. The method of claim 1 in which the trimerization catalyst is a quaternary ammonium carboxylate.

7. The method of claim 6 in which the trimerization catalyst is a quaternary ammonium carboxylate selected from the group consisting of trimethyl-2-hydroxypropylammonium formate; N-(2-hydroxypropyl) triethylenediamine 2-ethylhexanoate and dimethyl-2-hydroxyethyl-2-hydroxypropylammonium formate.

8. The method of claim 1 in which the trimerization catalyst is present in the reaction mixture in an amount from about 0.006 to 0.03 gram milliequivalents per 100 grams of polyol.

9. The method of claim 2 in which the trimerization catalyst is an alkali metal N-(2-hydroxyphenyl)methyl glycinate.

10. The method of claim 9 in which the trimerization catalyst is an alkali metal N-(2-hydroxy-5-nonylphenyl)methyl-N-methyl glycinate.

11. The method of claim 2 in which the trimerization catalyst is a quaternary ammonium carboxylate selected from the group consisting of trimethyl-2-hydroxypropylammonium formate; N-(2-hydroxypropyl) triethylenediamine 2-ethylhexanoate and dimethyl-2-hydroxyethyl-2-hydroxypropylammonium formate.

12. The method of claim 2 in which trimerization catalyst is present in an amount from about 0.008 to 0.03 gram milliequivalents per 100 grams of polyol.

13. The method of claim 2 in which the urethane catalyst composition comprises triethylenediamine as the gelling catalyst and bis(dimethylaminoethyl)ether or pentamethyldiethylenetriamine as the blowing catalyst and the trimerization catalyst is present in an amount from about 0.008 to 0.03 gram milliequivalents per 100 grams of polyol.

14. The method of claim 13 in which the trimerization catalyst is an alkali metal N-(2-hydroxyphenyl)methyl glycinate.

15. The method of claim 14 in which the trimerization catalyst is an alkali metal N-(2-hydroxy-5-nonylphenyl)methyl-N-methyl glycinate.

16. The method of claim 13 in which the trimerization catalyst is a quaternary ammonium carboxylate selected from the group consisting of trimethyl-2-hydroxypropylammonium formate; N-(2-hydroxypropyl) triethylenediamine 2-ethylhexanoate and dimethyl-2-hydroxyethyl-2-hydroxypropylammonium formate.

* * * * *